(12) United States Patent
Araki et al.

(10) Patent No.: US 11,159,118 B2
(45) Date of Patent: Oct. 26, 2021

(54) ELECTRIC POWER STEERING DEVICE

(71) Applicant: Mitsubishi Electric Corporation, Tokyo (JP)

(72) Inventors: Rei Araki, Tokyo (JP); Yu Kawano, Tokyo (JP); Norihiro Yamaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/606,782

(22) PCT Filed: May 11, 2017

(86) PCT No.: PCT/JP2017/017931
§ 371 (c)(1),
(2) Date: Oct. 21, 2019

(87) PCT Pub. No.: WO2018/207330
PCT Pub. Date: Nov. 15, 2018

(65) Prior Publication Data
US 2020/0382047 A1 Dec. 3, 2020

(51) Int. Cl.
*H02P 29/50* (2016.01)
*B62D 5/04* (2006.01)
*H02P 25/22* (2006.01)
*H02P 27/08* (2006.01)

(52) U.S. Cl.
CPC ............. *H02P 29/50* (2016.02); *B62D 5/046* (2013.01); *H02P 25/22* (2013.01); *H02P 27/08* (2013.01)

(58) Field of Classification Search
USPC ........................................................ 318/560
See application file for complete search history.

(56) References Cited

U.S. PATENT DOCUMENTS

| 2016/0036305 | A1 | 2/2016 | Kawata et al. |
| 2018/0093698 | A1 | 4/2018 | Urimoto et al. |
| 2019/0016373 | A1* | 1/2019 | Urimoto ............. B62D 5/0406 |

FOREIGN PATENT DOCUMENTS

| JP | 2004-48823 A | 2/2004 |
| JP | 2012-245848 A | 12/2012 |
| JP | 5177711 B2 | 4/2013 |
| JP | 2015-23663 A | 2/2015 |
| JP | 2016-034204 A | 3/2016 |

(Continued)

OTHER PUBLICATIONS

International Search Report of PCT/JP2017/017931 dated Jul. 18, 2017 [PCT/ISA/210].

(Continued)

*Primary Examiner* — Bentsu Ro
(74) *Attorney, Agent, or Firm* — Sughrue Mion, PLLC; Richard C. Turner

(57) ABSTRACT

An electric power steering device includes: an electric motor including multi-phase coils, which is configured to cause a steering mechanism of a vehicle to rotate; and a control unit including a plurality of inverter circuits configured to drive the electric motor, wherein the inverter circuits include capacitors for smoothing, which are small in number than phase number of the electric motor, and the capacitors are arranged between bridge circuits of respective phases of the inverter circuits.

10 Claims, 10 Drawing Sheets

(56) References Cited

FOREIGN PATENT DOCUMENTS

WO   2016/117144 A1   7/2016
WO   2017/068636 A1   4/2017

OTHER PUBLICATIONS

Communication dated Nov. 18, 2020 from the European Patent Office in Application No. 17908926.3.
S. Vishay et al., "Featured Products Power Modules Table of Contents", Vishay Intertechnology, Inc., Jan. 1, 2015, XP055750131, pp. 1-34 (34 pages).
Communication dated Apr. 8, 2020 from European Patent Office in EP Application No. 17908926.3.

* cited by examiner

ELECTRIC POWER STEERING DEVICE

CROSS REFERENCE TO RELATED APPLICATIONS

This application is a National Stage of International Application No. PCT/JP2017/017931, filed May 11, 2017.

TECHNICAL FIELD

The present invention relates to an electric power steering device, and more particularly, to an electric power steering device including inverter circuits a achieved downsizing.

BACKGROUND ART

In a related-art electric power steering device including so-called inverter circuits configured to supply a current to a motor, each inverter circuit includes a plurality of bridge circuits constructed by switching elements configured to supply and cutoff the current. For example, when the related-art electric power steering device includes a motor having three-phase coils, the device includes the bridge circuits of three phases (for example, see Patent Literature 1).

CITATION LIST

Patent Literature

[PTL 1] JP 5177711 B2

SUMMARY OF INVENTION

Technical Problem

However, the related-art has the following problems.

In such a related-art electric power steering device as disclosed in Patent Literature 1, in association with control of the switching elements, capacitors for smoothing are required for suppression of a current fluctuation. Specifically, a circuit including two smoothing capacitors configured to absorb ripple currents is required to be provided to a three-phase inverter circuit.

In a related-art device prior to the device as described in Patent Literature 1, respective capacitors are arranged in the immediate vicinities of switching device groups of each phase. That is, Patent Literature 1 achieves an improvement of reduction in number of capacitors from three, which is the phase number of the motor, to two.

The capacitors are important components in order to suppress the ripple currents caused by the current control of turning ON and OFF of the switching elements. In particular, capacitance of a capacitor is determined in relation to an effect of the suppression of the ripple current. Thus, in Patent Literature 1, wiring impedance is contrived to be suppressed to be low so that the total number of capacitors is reduced.

However, in such an electric power steering device including two sets of inverter circuits as described in Patent Literature 1, a ripple current caused by switching of one set may affect the other set. Therefore, only the reduction in wiring impedance is not sufficient to obtain an effect of the suppression of the ripple current, and hence there is room for improvement.

The present invention has been made to solve the problems described above, and provides an electric power steering device in which, while an influence of ripple currents is suppressed, the capacitance or the number of smoothing capacitors can be reduced, and consequently the device can be downsized.

Solution to Problem

According to one embodiment of the present invention, there is provided an electric power steering device including: an electric motor including multi-phase coils, which is configured to cause a steering mechanism of a vehicle to rotate; and a control unit including a plurality of inverter circuits configured to drive the electric motor, wherein the inverter circuits include capacitors for smoothing, which are small in number than phase number of the electric motor, and the capacitors are arranged between bridge circuits of respective phases of the inverter circuits.

Advantageous Effects of Invention

According to the present invention, there is adopted the configuration in which the inverter circuits include the capacitors for smoothing, which are small in number than the phase number of the electric motor and the capacitors for smoothing are arranged between the bridge circuits of the respective phases of the inverter circuits. As a result, there can be provided the electric power steering device in which the influence of the ripple currents can be suppressed, and the capacitance or the number of the smoothing capacitors can be reduced, and consequently the device can be downsized.

DESCRIPTION OF EMBODIMENTS

Now, with reference to the drawings, an electric power steering device according to preferred embodiments of the present invention is described.

First Embodiment

Figure 1:
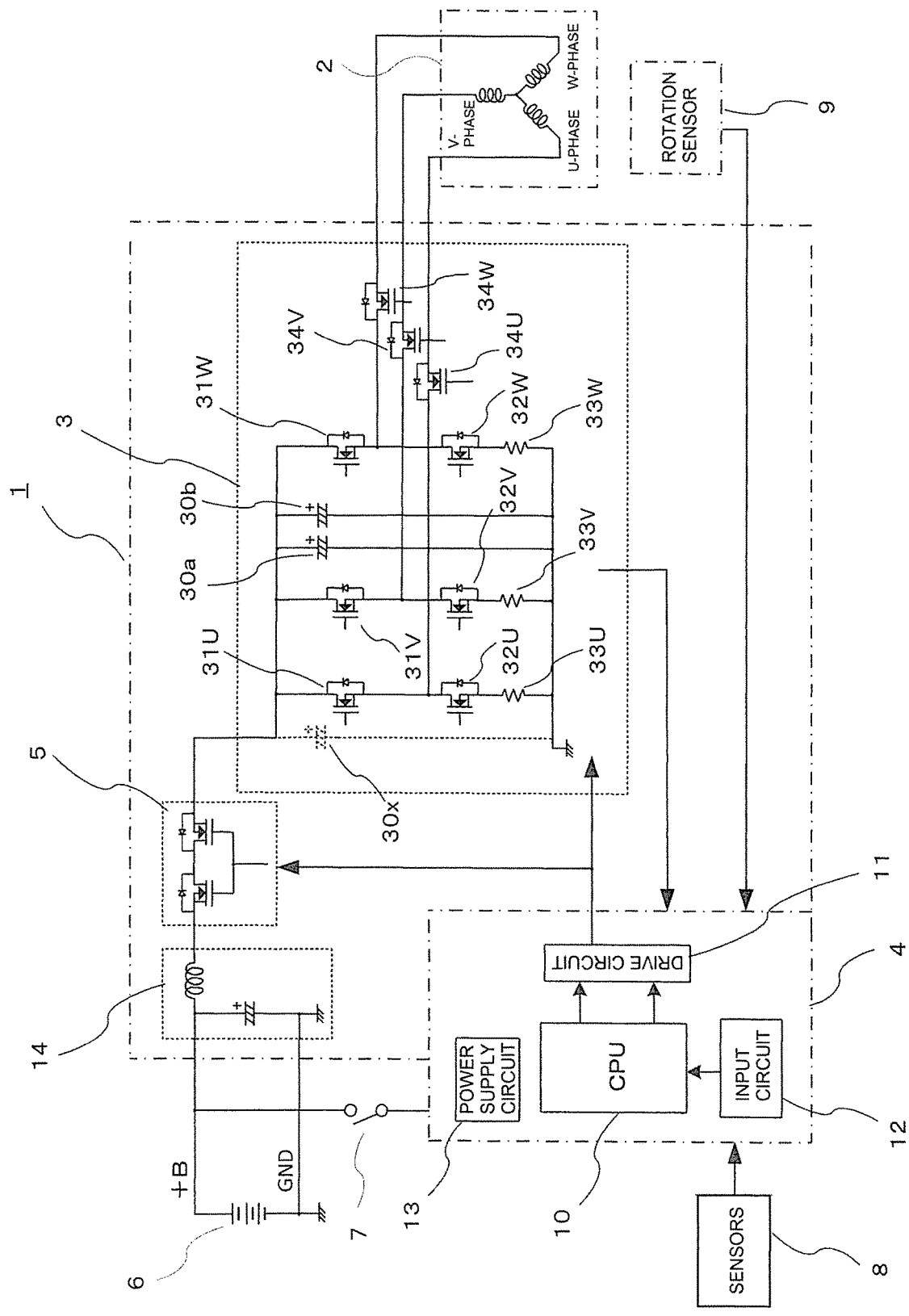
FIG. 1 is an overall circuit diagram of an electric power steering device according to a first embodiment of the present invention.

FIG. 1 is an overall circuit diagram of an electric power steering device according to a first embodiment of the present invention. The electric power steering device illustrated in FIG. 1 includes a control unit 1 including a motor drive circuit, and a motor 2.

The motor 2 is a three-phase brushless motor. A rotation sensor 9 configured to detect a rotation angle of the motor is arranged for the brushless motor 2 in the vicinity of an output shaft of the motor.

The control unit 1 includes, as main components, a control calculation unit 4 having relatively low current consumption, and an inverter circuit 3 configured to supply and cut off a current to the motor 2. The control calculation unit 4 mainly includes a CPU 10, a drive circuit 11, an input circuit 12, a power supply circuit 13, and other components.

The inverter circuit 3 includes bridge circuits including high-side switching elements 31 and low-side switching elements 32 configured to supply currents to the respective three-phase coil groups, motor relay switching elements 34 capable of cutting off the currents to the motor 2, shunt resistors 33 to be used for current detection, and capacitors 30a, 30b, and other components.

In this case, each phase includes the same circuit, and hence each element of the high side switching elements 31, the low-side switching elements 32, the shunt resistors 33, the motor relay switching elements 34 is denoted with U, V, and W of coil names as suffixes to those symbols.

Further, a power supply relay 5, which can cut off the current supply itself to the motor 2, is provided in the control unit 1. As illustrated in FIG. 1 as an example, the power supply relay 5 includes FETs as semiconductor switching elements. Still further, a noise filter 14 is also provided in the control unit 1.

Moreover, a battery 6, an ignition switch 7, and sensors 8 mounted to a vehicle are connected to the control unit 1 as illustrated in FIG. 1.

The control calculation unit 4 includes the input circuit 12. The input circuit 12 receives, as input signals, pieces of information from the sensors 8 such as a vehicle speed sensor, and a torque sensor configured to detect a steering torque of a steering wheel, a detection result of a voltage or a current of each section in the inverter circuit 3, a detection result of the rotation angle by the rotation sensor 9, and other such information.

As general operation, the control calculation unit 4 calculates currents to be supplied to coils of the motor 2 by the CPU 10 based on the input information from the sensors 8 obtained via the input circuit 12, and performs switching control on the inverter circuit 3 via the drive circuit 11.

When the switching elements 31, 32, and 34 of each phase are driven by the drive circuit 11, desired currents flow to motor windings. Further, values of currents supplied to the coils of the motor 2 are detected by the input circuit 12 as actual current values via the shunt resistors 33. Then, the CPU 10 executes feedback control in accordance with deviations between calculated values (target values) and actual current values.

Further, the CPU 10 uses rotation angle information of the rotation sensor 9 to calculate a rotation position or speed of the motor so as to use the rotation position or speed for rotation control of the motor.

Meanwhile, the drive circuit 11 also controls the switching elements of the power supply relay 5 together with the switching elements 31, 32, and 34 of the bridge circuits.

In a related-art device prior to the device described in Patent Literature 1, capacitors in the inverter circuit 3 are arranged and connected to each phase. This state corresponds to a capacitor 30x indicated by the dotted line in FIG. 1.

Further, in Patent Literature 1, two capacitors 30a and 30b in the inverter circuit 3 are connected as illustrated in FIG. 1. In contrast, an arrangement and an improvement in connection of the capacitors of the first embodiment are described in detail with reference to FIG. 2 and FIG. 3.

FIG. 2A to FIG. 2D are explanatory diagrams for illustrating a current flow of the related-art device described in Patent Literature 1. In the related-art device described in Patent Literature 1, the number of capacitors is reduced from three to two. Further, in the related-art device, two capacitors are arranged outside the bridge circuit of each phase.

Figure 2A:
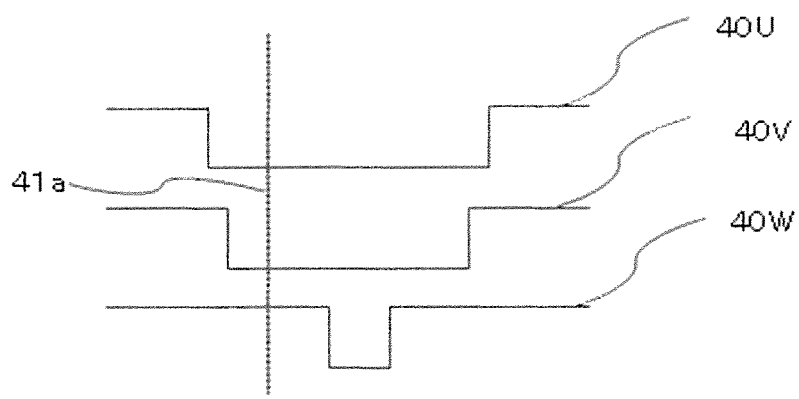
FIG. 2A is an explanatory diagram for illustrating a current flow of a related-art device described in Patent Literature 1.
Figure 2B:
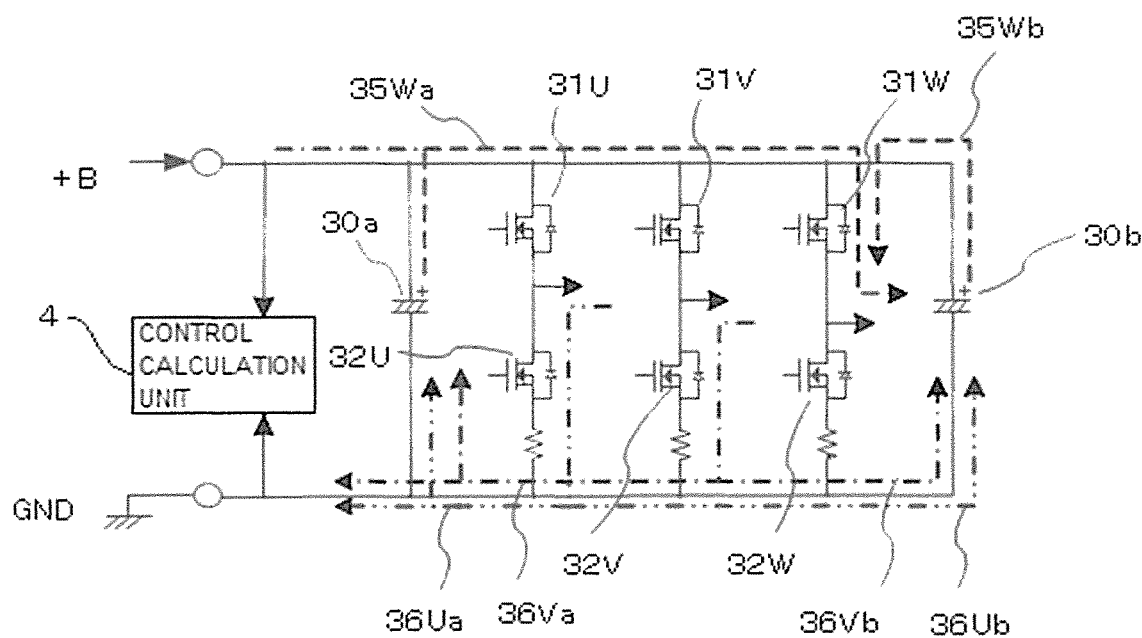
FIG. 2B is an explanatory diagram for illustrating the current flow of the related-art device described in Patent Literature 1.

A timing chart illustrated in FIG. 2A is a diagram for illustrating a drive state of each phase. Further, FIG. 2B is a diagram for illustrating a current flow in the inverter circuit. First, signals 40U, 40V, and 40W in the timing chart illustrated in FIG. 2A indicate drive signals for switching elements of a U-phase, a V-phase, and a W-phase, respectively, and express ON and OFF states of the switching elements.

When a waveform of the timing chart is High, this indicates a state in which the high-side switching element is ON and the low-side switching element is OFF. When the waveform of the timing chart is Low, this indicates a state in which the low-side switching element is ON and the high-side switching element is OFF.

A state at a certain timing 41a illustrated in FIG. 2A corresponds to a state in which a U-phase switching element 32U is ON, a V-phase switching element 32V is ON, a W-phase switching element 31W is ON, and other inverter switching elements are OFF. In the state at such a timing 41a, in the circuit diagram illustrated in FIG. 2B, currents 35Wa and 35Wb are supplied to the motor (not shown) from the capacitors 30a and 30b via the switching element 31W.

Further, currents 36Ua, 36Va, 36Ub, and 36Vb return to the capacitors 30a and 30b via coils of the W-phase, V-phase, and U-phase of the motor. In attention to a return path, the currents 36Ua, 36Va, 36Ub, and 36Vb return to negative terminals of the capacitors 30a and 30b via switching elements 32U and 32V of a lower arm.

Still further, in careful attention to the currents 36Ua, 36Va, 36Ub, and 36Vb, the current that has passed through the switching element 32U is then branched into the two currents 36Ua and 36Ub, the current 36Ua returns to the capacitor 30a, and the current 36Ub returns to the capacitor 30b.

Similarly, the current that has passed through the switching element 32V is then branched into the current 36Va and the current 36Vb, and return to the capacitors 30a and 30b, respectively. The current is also flowing from a +B and to a GND.

Figure 2C:
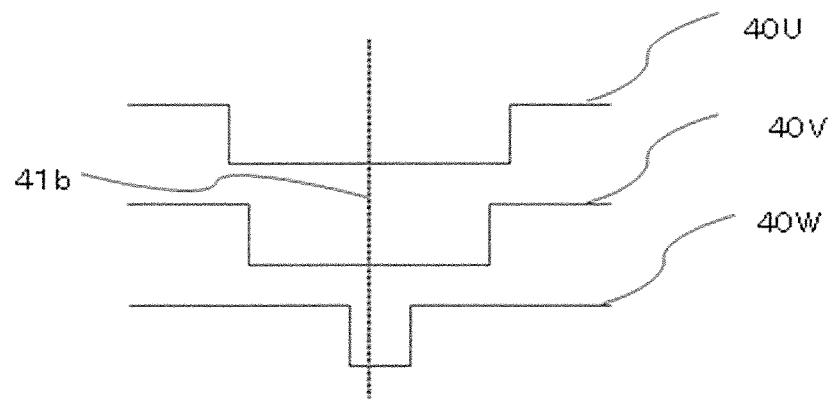
FIG. 2C is an explanatory diagram for illustrating the current flow of the related-art device described in Patent Literature 1.

Next, in a timing chart illustrated in FIG. 2C, a state observed when the timing is moved from 41a to 41b is illustrated. That is, at the timing 41b, the switching element 31W of the upper arm is changed from ON to OFF, and the switching element 32W of the lower arm is changed from OFF to ON.

In the state at the timing 41b, the currents, which return to the capacitors via the switching elements 32U and 32V (both are ON) at the previous timing 41a, do not return to the capacitors 30a and 30b, but return to the coils of the motor for circulation via the switching element 32W of the lower arm.

That is, at the timing 41b, current supply from the capacitors 30a and 30b are not basically performed. Instead, at the timing 41b, the current circulates in a closed circuit formed by the low-side switching elements 32U, 32V, and 32W, and the motor coils.

Figure 2D:
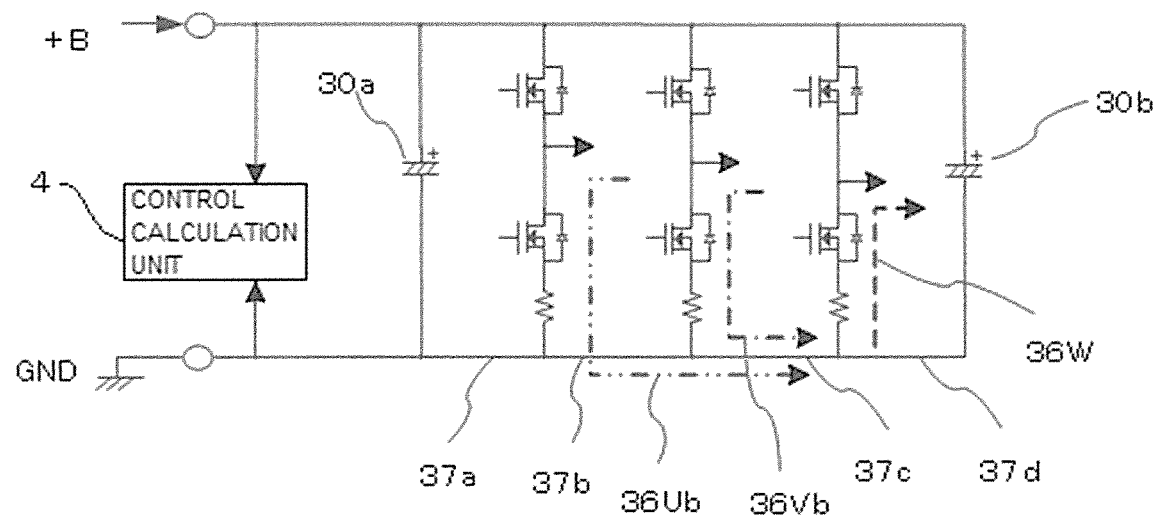
FIG. 2D is an explanatory diagram for illustrating the current flow of the related-art device described in Patent Literature 1.

In the state, in attention to GND lines 37a, 37b, 37c, and 37d, in particular, there is a difference in current flowing in the GND line 37a as compared with the case of FIG. 2B. That is, in the GND line 37a, the current 36Ua and the current 36Va flow as illustrated in FIG. 2B, but almost no current flows as illustrated in FIG. 2D.

Further, for other GND lines 37b, 37c, and 37d, the current is flowing at the timing 41b, but there is a difference in a flowing current amount and a direction as compared with the case at the timing 41a.

When the timing is changed from the timing 41a to the timing 41b, in fact, it is common to prepare a dead time. That is, at first, the switching element 31W of the upper arm is changed from ON to OFF, and after a lapse of any dead time, the switching element 32W of the lower arm is changed from OFF to ON.

In attention to such a change due to the dead time, there is a period in which both the switching device 31W of the upper arm and the switching element 32W of the lower arm are turned off. In the period, the current circulates in the closed circuit formed by the low-side switching elements 32U, 32V, and 32W and the motor coils as described above via a parasitic diode of the switching element 32W.

However, there remains a fact that the current is circulating through the switching element 32W of the lower arm. Therefore, a concept of a current change of the GND lines 37a, 37b, 37c, and 37d in association with a change from the state at the timing 41a to the state at the timing 41b is as described above.

Thus, in response to the ON and OFF control of the switching elements, even when impedance of the wirings is made as small as possible, and each phase is made identical, every time the phase is switched, there is a difference in current flowing in the GND lines.

In general, each terminal of the power supply +B and the GND is branched to connect the control calculation unit 4 in parallel. For example, when a large change in current in the GND line 37a occurs, a voltage change (surge voltage) in response to the inductance and the current change in the GND line 37a occurs.

That is, a transient voltage change occurs in the GND line as compared to the GND in the control calculation unit 4. As a result, for example, a problem of accuracy in a detection value of a voltage difference between both ends of the shunt resistor 33 occurs.

The problem is assumed based on a case in which, for example, a voltage between both of the ends of the shunt resistor 33 is monitored through use of a differential amplifier circuit formed by an operational amplifier in the control calculation unit 4. As long as the differential amplifier circuit is ideal, the transient voltage change (in-phase noise) as described above is canceled. However, in fact, the differential amplifier circuit cannot completely cancel the in-phase noise. Therefore, as described above, there are some cases in which the problem of accuracy in detection value occurs.

Further, in the case of a capacitor arrangement illustrated in FIG. 2B and FIG. 2D, for example, a current flow and an amount of the current are different due to an arrangement relationship between the capacitor 30a and the capacitor 30b. Therefore, it is conceivable that both of the capacitors 30a and 30b cannot be used equally so that there may be fears of difference in lifetime and a decrease in function of the capacitors.

Then, in the first embodiment, attention is paid to a fact that a difference between currents flowing to the capacitors 30a and 30b can be suppressed by contriving an arrangement and wiring in association with the capacitors 30a and 30b. Then, specific contents in association with contrivance of such an arrangement and wiring are described with reference to FIG. 3A to FIG. 3D.

FIG. 3A to FIG. 3D are explanatory diagrams for illustrating a current flow of the electric power steering device according to the first embodiment of the present invention. FIG. 3A to FIG. 3D are described in the same manner as FIG. 2A to FIG. 2D, but only the arrangement of the capacitors 30a and 30b are different. That is, the two capacitors 30a and 30b of the first embodiment are both connected inside the wirings of the three phases. Further, both the capacitors 30a and 30b are arranged and wired to be adjacent to each other.

Figure 3A:
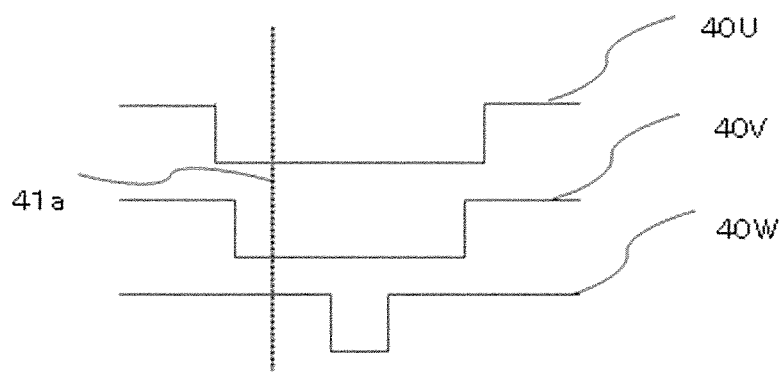
FIG. 3A is an explanatory diagram for illustrating a current flow of an electric power steering device according to the first embodiment of the present invention.
Figure 3B:
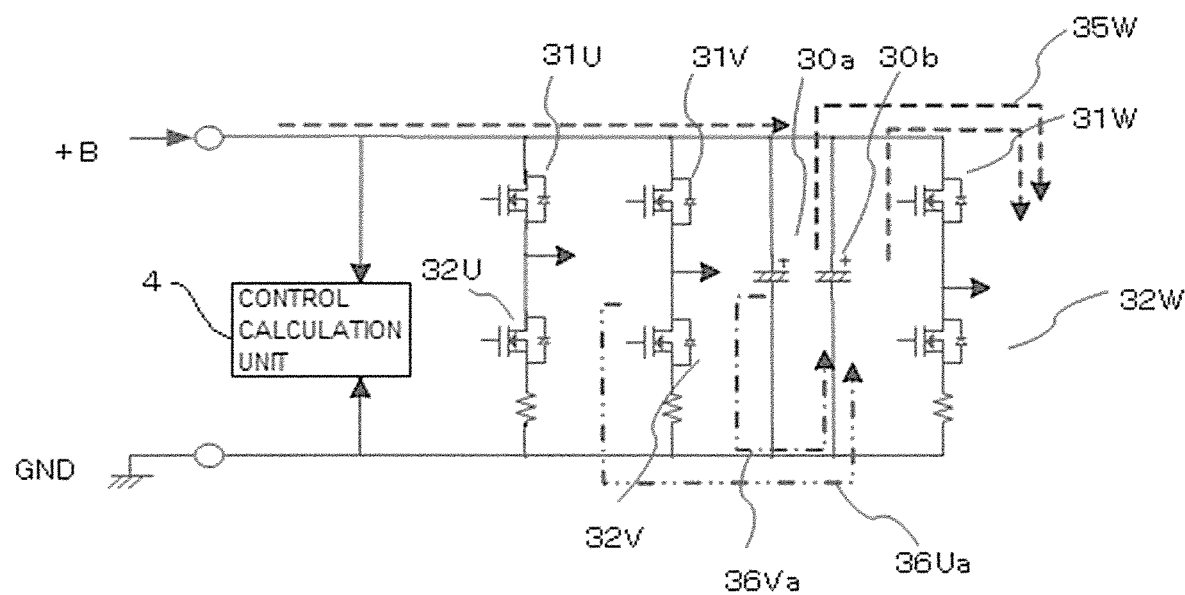
FIG. 3B is an explanatory diagram for illustrating the current flow of the electric power steering device according to the first embodiment of the present invention.

In the state, as in the case illustrated in FIG. 2, the current flow at the timing 41a and the current flow at the timing 41b are compared. At the timing 41a of FIG. 3A, as illustrated in FIG. 3B, the current 36Ua and the current 36Va flow from the capacitors 30a and 30b via the switching element 31W of the upper arm to the motor, and return to negative terminals of the capacitors 30a and 30b via the switching elements 32U and 32V of the lower arm in a return path.

Figure 3C:
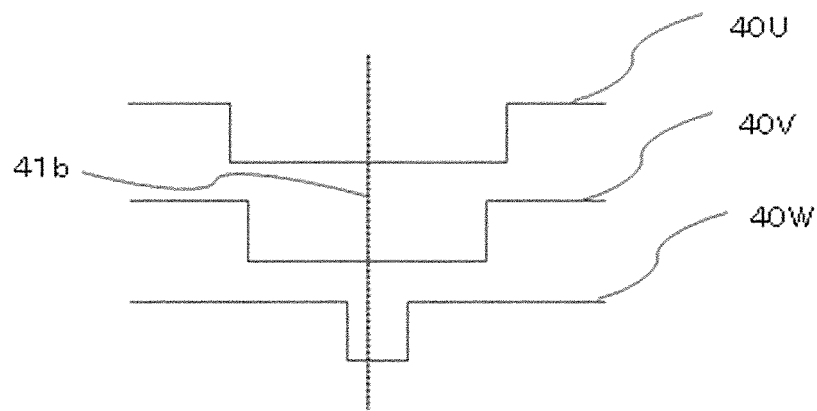
FIG. 3C is an explanatory diagram for illustrating the current flow of the electric power steering device according to the first embodiment of the present invention.
Figure 3D:
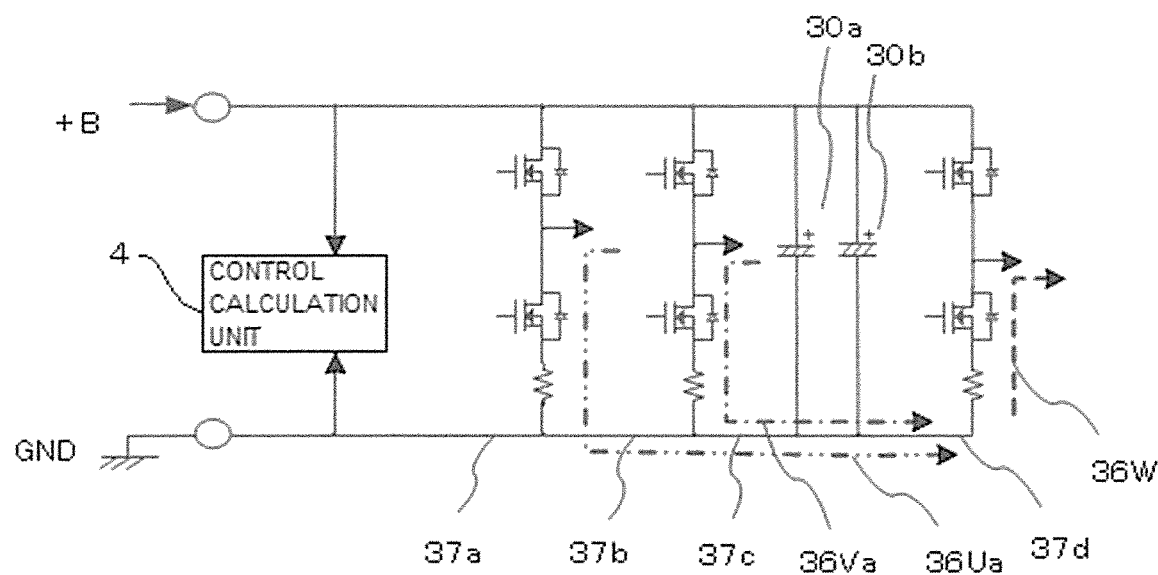
FIG. 3D is an explanatory diagram for illustrating the current flow of the electric power steering device according to the first embodiment of the present invention.

Meanwhile, at the timing 41b of FIG. 3C, as illustrated in FIG. 3D, the current 36Ua and the current 36Va, which return via the switching elements 32U and 32V, return via the parasitic diode of the switching element 32W of the lower arm to the motor when the current 36Ua and the current 36Va flow through the switching element 32W of the lower arm, or during the dead time period.

For example, when attention is paid to the GND line 37a, and when the timing 41a is compared to the timing 41b, it is understood that no current flows from the capacitors 30a and 30b, and there is no change in current.

This indicates that, in a portion of the GND line 37a, the surge voltage caused by inductance is suppressed. In this case, for example, in the GND and the shunt 33U of the U-phase of the control calculation unit 4, the transient voltage change is suppressed. Then, an adverse influence on detection accuracy in a voltage difference between both of the ends of the shunt of U-phase, which is caused by switching of W-phase when the timing 41*a* is changed to the timing 41*b*, can be suppressed.

Further, when attention is paid to the GND line 37*b*, at the timing 41*a* and the timing 41*b*, there is also no change in current, and the surge voltage is also suppressed. Therefore, an adverse influence on detection accuracy in a voltage difference between both of the ends of the shunt of V-phase, which is caused by switching of the W-phase, can be suppressed.

In the case of FIG. 3D, even in the GND line 37*c*, there is little change in current during the transition from the state at the timing 41*a* to the state at the timing 41*b*. That is, in the arrangement illustrated in FIG. 3D, the respective cathodes of the capacitor 30*a* and the capacitor 30*b* and the GND line are connected in close proximity so that an influence of current change is almost negligible.

As a result, a change in current only occurs in the GND line 37*d*. That is, the W-phase is affected by a surge voltage caused by switching to its own phase at a timing of switching to its own phase. However, as compared with the case of FIG. 2, the voltage change between the GND of the control calculation unit 4 and the shunt 33W can be suppressed to be small. This is because the voltage changes in GND lines 37*a*, 37*b*, and 37*c* can be suppressed.

Still further, when there is only the influence caused by switching to its own phase, the timing at which a voltage difference between both ends of a shunt is shifted from the timing of switching in the control calculation unit 4 so that it is easily possible not to be affected by an adverse influence on detection accuracy.

Thus, as illustrated in FIG. 3B and FIG. 3D, the capacitors 30*a* and 30*b* are connected in the inner wirings of three phases, and hence paths in which the currents involved in switching of the inverter flow can be aggregated. As a result, a surge voltage caused by a current change by switching can be suppressed.

As described above, according to the electric power steering device of the first embodiment, not only the impedance is made as small as possible, but also as the arrangement and wiring of the capacitors are contrived, with the result that a transient voltage change caused by a current change can be suppressed.

Referring to the wirings to the capacitors described in Patent Literature 1, from FIG. 12, FIG. 13, FIG. 14, for example, and descriptions in paragraphs 0040 to 0043, for example, the two capacitors are connected to an upstream of the U, V, and W terminals, which is output of the inverter. That is, the capacitors described in Patent Literature 1 are not connected between the respective terminals to the motor at least as in this application.

Even when one capacitor 30*b* is arranged on a side away from a power supply terminals (+B and GND) outside the inverter circuit, the effect of suppressing the transient voltage change caused by the current change described above can be expected. However, the capacitor 30*b* is positioned physically away from the switching element of the U-phase and the switching element of the V-phase, with the result that impedance cannot be reduced so that a fear of weakening operation of the capacitors occurs.

Further, in such an arrangement, a difference between the operation of the capacitor 30*a* and that of the capacitor 30*b* is increased, with the result that fears of difference in lifetime and a decrease in function of the capacitors may occur. Therefore, it is preferred to arrange all the capacitors 30*a* and 30*b* inside the inverter circuit.

As described above, it is desired that the capacitor 30*a* and the capacitor 30*b* be arranged and wired to be close to each other. In particular, with a configuration in which each point of the power supply line and the GND line is branched to both the capacitors for connection, the difference in operation of both of the capacitors can be made small.

Further, in the first embodiment described above, only one type of a drive mode of the switching elements is described with reference to FIG. 2A to FIG. 2D, and FIG. 3A to FIG. 3D. However, even in other modes, a similar situation occurs. In a case in which the above-mentioned mode in the order of U, V, and W is expressed by (001), when other modes, which are (100), (010), (110), (101), and (011), are used, and when attention is particularly paid to the GND line 37*a*, it is possible to eliminate a current change and to suppress a voltage change in any case.

Figure 4A:
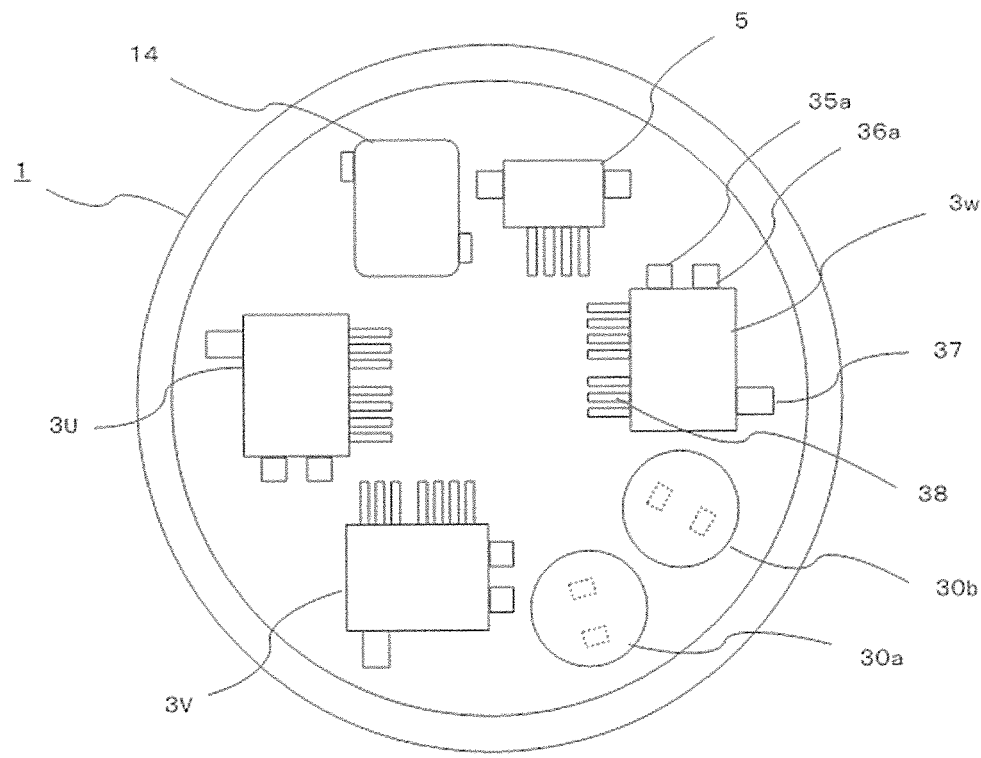
FIG. 4A is a top view of a control unit in the first embodiment of the present invention.
Figure 4B:
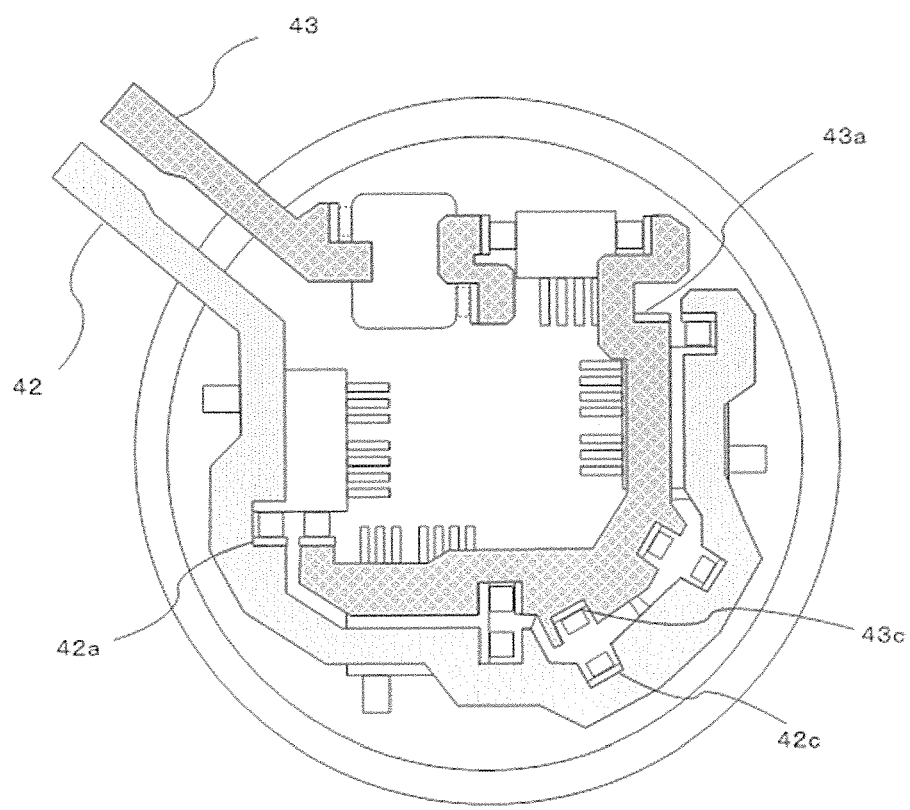
FIG. 4B is a power supply system wiring view added with power supply system wiring bars with respect to the top view illustrated in FIG. 4A in the first embodiment of the present invention.

Next, a physical wiring structure to achieve electrical wiring is described with reference to FIG. 4. FIG. 4A is a top view of the control unit 1 in the first embodiment of the present invention. FIG. 4B is a power supply system wiring view added with power supply system wiring bars to the top view illustrated in FIG. 4A in the first embodiment of the present invention.

The motor 2 is integrated at a lower portion of the control unit 1. Therefore, the control unit 1 has a circular shape in accordance with a shape of the motor 2. Two distal end portions of two wiring bars of a GND line 42 and a power supply line (+B) 43 extend as connector terminals.

In the top view of the control unit 1 illustrated in FIG. 4A, a filter 14, a power supply relay 5, so-called power modules 3U, 3V, and 3W, in which the bridge circuits of each of the phases U, V, and W are integrated, and the capacitors 30*a* and 30*b* are illustrated.

As illustrated in FIG. 4A, the capacitors 30*a* and 30*b* are arranged to be adjacent to each other between the power module 3V and the power module 3W. The control calculation unit 4 is arranged, for example, above or below those components as a two-story structure and the illustration thereof is omitted.

A state in which power supply system bus bars are arranged above each component described above is illustrated in FIG. 4B. The distal end portions of the GND line 42 and the power supply line 43 extend outside the control unit 1 to form terminals. The power supply line 43 extends into the control unit 1, firstly, to be connected in series to the filter 14, and is then connected in series to the power supply relay 5, which is formed in a power module.

Then, firstly, a power supply terminal 35*a* of the power module 3W and a connection portion 43*a* of the power supply line 43 are connected to each other. The power modules 3U, 3V, and 3W have all the same shape and circuit. Then, each of the power modules 3U, 3V, and 3W has a structure in which the power supply terminal 35*a* and a GND terminal 36*a* are arranged on one side thereof, a motor terminal 37 is arranged outside in a radial direction, and a plurality of control terminals 38 are arranged in an inner diameter direction, which is opposite to the outside in the radial direction.

Therefore, the connection portion 43*a* of the power supply line 43 and the power supply terminal 35*a* of the power module 3W are electrically connected by welding. In the same manner, the power supply terminals of the power modules 3V and 3U are also connected to the power supply line 43.

Further, the GND line 42 is arranged to be adjacent to the power supply line 43 such that a current flows parallel to that of the power supply line 43 in a region between the respective phases of the inverter bridge circuits. Therefore, firstly, the GND terminal 36a of the power module 3U and the connection portion 42a of the GND line 42 are connected to each other, and the power modules 3V and 3 W are then connected in the stated order in the same manner.

The capacitors 30a and 30b each have negative terminals 42c and positive terminals 43c, which are arranged substantially in the radial direction. Both terminals 42c and 43c are welded to the GND line 42 and the power supply line 43, respectively, as in the power modules 3U, 3V, and 3W. As a result, in connection positions of the capacitors 30a and 30b, at least one of the inverter bridge circuits is arranged and wired on an upstream side and a downstream side of the positive power supply source.

As described above, the arrangement and connection of the components are contrived, and hence both of the capacitors 30a and 30b are arranged and connected between the power modules 3V and 3W of the V-phase and the W-phase. Therefore, the electrical wiring illustrated in FIG. 3B and FIG. 3D can be achieved as the physical wiring structure illustrated in FIG. 4A and FIG. 4B.

The GND line 42 and the power supply line 43 are arranged in parallel. Further, the capacitors 30a and 30b are arranged between the inverter circuits formed as the power modules 3U, 3V, and 3W of each phase, and are connected to the GND line 42 and the power supply line 43, respectively.

Through adoption of such a wiring structure, the current flow can be controlled. Further, through adoption of such a wiring structure, without depending on drive conditions of the inverter circuits, an effect of suppressing noises such as current detection and the like obtained as the result can be achieved.

Note that, the motor may not be a three-phase motor, and a multi-phase motor having four or more phases is applicable. Further, in FIG. 4, the two capacitors 30a and 30b are arranged and wired to be adjacent to each other, but one of the capacitors may be arranged and wired between the power modules 3U and 3V.

Further, a specific example, in which the two capacitors smaller in number of phases with respect to the three-phase motor are used, has been described in the first embodiment, but the number of capacitors may be one rather than two, and may be three or more, which are equal to or more than the phase number of the motor.

Further, in the description of the first embodiment, the power modules are used as the inverter circuits, and the bus bars are used as the power supply line and the GND line. However, instead of using such two wiring bars, power supply wiring may be formed by a substrate such as a printed substrate or a metal substrate.

Second Embodiment

Figure 5:
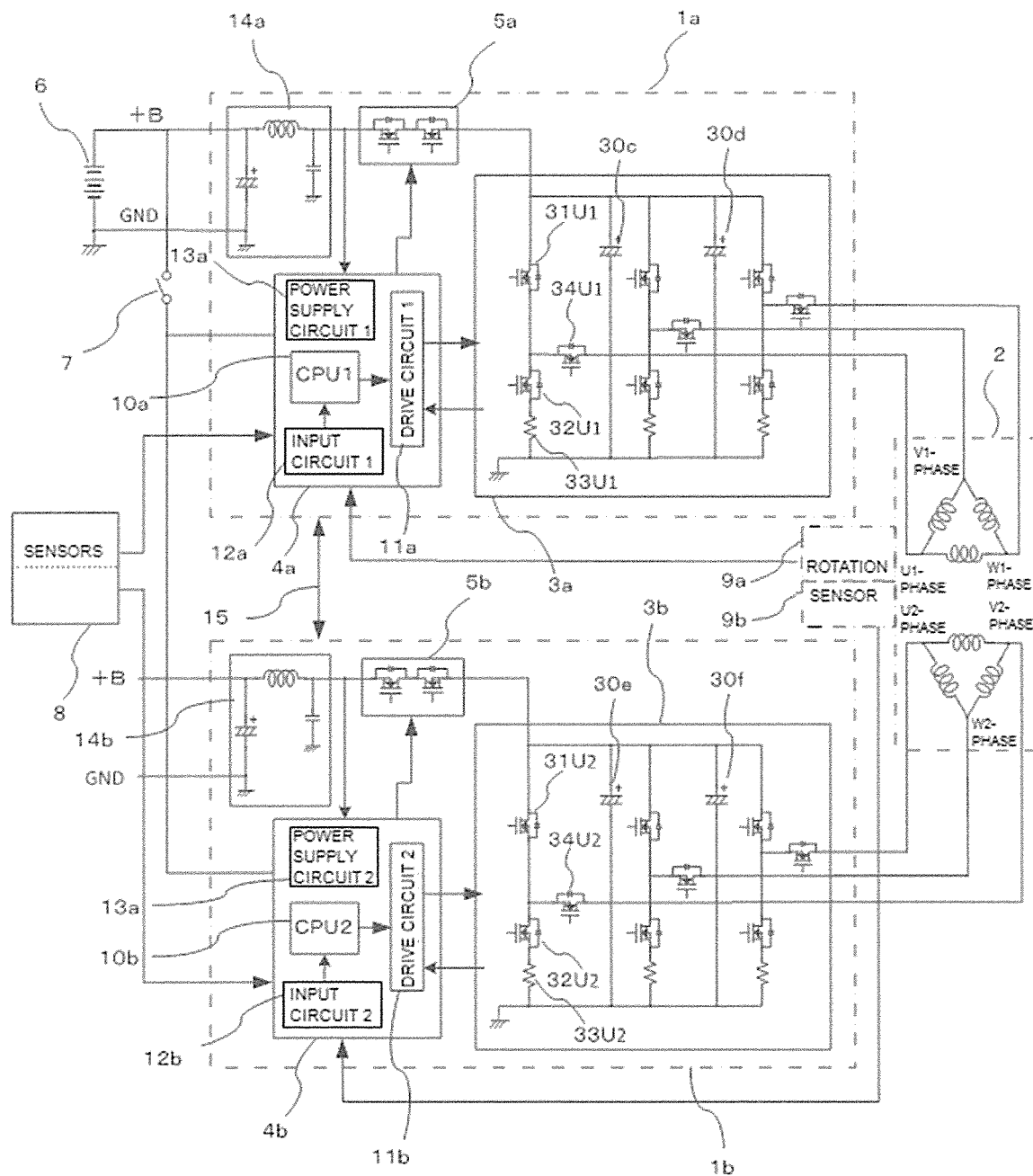
FIG. 5 is a circuit diagram of an overall electric power steering device according to a second embodiment of the present invention.

FIG. 5 is a circuit diagram of an overall electric power steering device according to a second embodiment of the present invention. The electric power steering device of the second embodiment includes two control units 1a and 1b, and two sets of three-phase motors 2, and accordingly includes two control units and two sets of motors.

In this case, the control units 1a and 1b have the same configuration, and substantially the same components are mounted to each of the control units 1a and 1b. Further, the control units 1a and 1b have substantially the same circuit configuration as the circuit network in the first embodiment described above. In the following, detailed operation of the control unit 1a is described.

The control unit 1a mainly includes a control calculation unit 4a including a CPU 10a, an inverter circuit 3a configured to supply a current to the motor 2, a power supply relay 5a, and a filter 14a.

The control calculation unit 4a is connected to a power supply +B and a GND of a battery 6 mounted to a vehicle, and electric power is supplied to the control calculation unit 4a via an ignition switch 7. Further, for example, pieces of information, such as information from a torque sensor mounted to a vicinity of a steering wheel and configured to detect a steering torque and information from a speed sensor configured to detect running speed of the vehicle, are input from sensors 8 to the control calculation unit 4a.

The information from the sensors 8 is transmitted via an input circuit 12a to the CPU 10a of the control calculation unit 4a. The CPU 10a calculates a current value, which is a control amount to cause the motor 2 to rotate, based on the information, and outputs an output signal corresponding to the calculated value.

The output signal is transmitted to a drive circuit 11a forming an output circuit, and the inverter circuit 3a. The drive circuit 11a of the output circuit receives a command signal from the CPU 10a, and outputs a drive signal for driving each switching element of the inverter circuit.

The inverter circuit 3a mainly includes switching elements 31 and 32 of an upper arm and a lower arm for the three-phase windings U1, V1, and W1 of the motor 2, motor relay switching elements 34 configured to connect and disconnect wiring to the motor windings, shunt resistors 33 for current detection, and capacitors 30c and 30d for current ripple suppression. The inverter circuit 3a has the same circuit configuration for each phase winding, and can independently supply a current to each phase winding.

Further, pieces of information, such as information on potential differences between both ends of the shunt resistors 33 and information on voltages of the motor winding terminals, are also transmitted to the control calculation unit 4a. The information is also input to the CPU 10a. Then, the CPU 10a calculates a difference from a detection value corresponding to the calculated current value, and performs feedback control, with the result that a desired current is supplied to the motor 2 to assist a steering force.

Still further, a drive signal of the switching elements of the power supply relay 5a, which operates as a relay configured to supply and cut off the power source to the inverter circuit 3a, is also output from the CPU 10a. Then, the CPU 10a can supply and cut off a current to the motor itself by turning ON and OFF of the switching elements of the power supply relay 5a.

Yet further, the motor relay switching elements 34U1, 34V1, and 34W1 are also arranged in the inverter circuit 3a. Therefore, the CPU 10a can also individually connect to and shut off the line of each phase.

Yet further, the inverter circuit 3a is driven by PWM by a signal output from the CPU 10a via the drive circuit 11a. Due to the PWM driving, a switching noise at the time of turning ON and OFF of the switching elements and a current variation (ripple) occur. To suppress the noise and the ripple, a plurality of capacitors are arranged.

Although a detailed description is omitted, a control unit 1b also performs the same operation as that of the control unit 1a described above.

Further, each of the plurality of capacitors in the inverter circuit 3a and the plurality of capacitors in the inverter circuit 3b is not individually arranged for each phase, but two capacitors are collectively connected between each of the phases. That is, as illustrated in FIG. 5, the two capacitors 30c and 30d are arranged in the inverter circuit 3a, and two capacitors 30e and 30f are arranged in the inverter circuit 3b.

The power supply line and the GND line are connected to both of the switching elements of the power supply relay 5 and the filter 14a, and switching elements of the power supply relay 5b and the filter 14b.

The motors 2 in the second embodiment is a brushless motor including two sets of three-phase windings which are delta-connected, and hence rotation sensors 9a and 9b configured to detect rotation positions of the rotors are mounted. Two sets of the rotation sensors are also mounted to the respective motors to secure redundancy, and the rotation information is transmitted to the input circuits 12a and 12b of the respective control calculation units 4a and 4b.

Note that the motor may not have a three-phase delta connection, but may have a star connection, and further, may be a multi-phase motor having four phases or more. Still further, distributed winding and concentrated winding can be employed for a winding method as in the related-art device. Yet further, the motor may be a tandem motor having two stators.

As described above, the control units 1a and 1b each use independently the input information and the calculated value of the control amount so as to independently drive the motor. Further, a communication line 15 is connected to send and receive data and information between the control units 1a and 1b. The communication line 15 is connected between the CPU 10a and the CPU 10b to allow exchange of any data, and hence situations of a counterpart control unit or a CPU can be grasped.

Figure 6A:
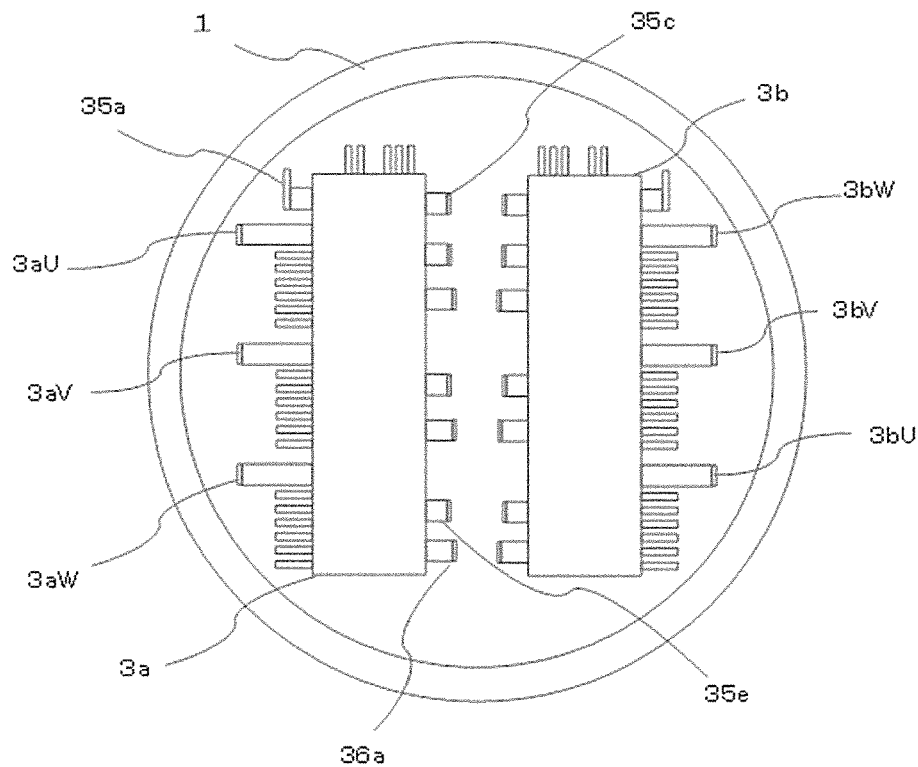
FIG. 6A is a top view of a control unit in the second embodiment of the present invention.

In particular, a connecting structure of the capacitors to the power supply system line at the time when the circuit having the above-mentioned configuration is mounted to one unit is described with reference to FIG. 6. FIG. 6A is a top view of the control unit 1 in the second embodiment of the present invention. A state in which two power modules 3a and 3b are arranged is illustrated in FIG. 6A. Above the arrangement illustrated in FIG. 6, a structure in which wirings of the power supply system and further the control calculation units 4a and 4b are layered is formed.

The power modules 3a and 3b are arranged in line symmetry. Although the respective power modules 3a and 3b are arranged in line symmetry, the power modules 3a and 3b have substantially a similar structure, and the power module 3a is mainly described in the following description.

The three-phase inverter circuit 3a and further the power supply relay 5a of FIG. 5 are collectively included in the power module 3a. Thick terminals 3aU, 3aV, and 3aW at an outer side in a radial direction are output terminals to the motor, and a plurality of control terminals are arranged in the vicinities of the output terminals.

A signal of the power supply line passes through the filter 14a of FIG. 5, and is sent to a power supply terminal 35a of the power supply line. Then, the signal of the power supply line passes through the power supply relay 5a, and is output from an output terminal 35c. Further, GND terminals 36a and power supply terminals 35e are arranged in three sets in a pair on an inner diameter side. Note that, the above descriptions also can be applied to the power module 3b.

Figure 6B:
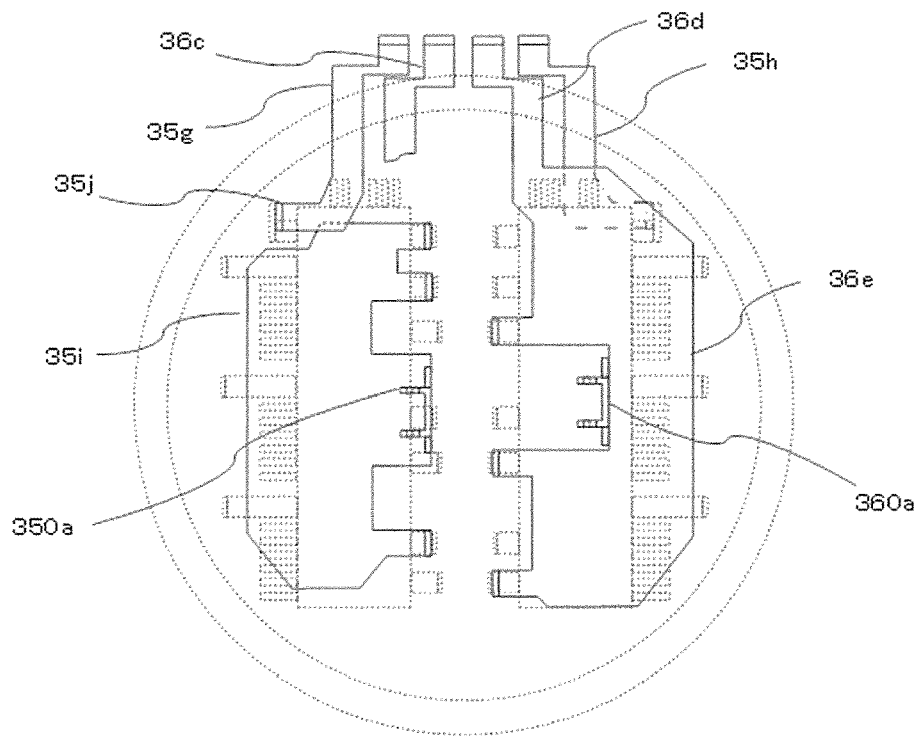
FIG. 6B is a power supply system wiring view added with power supply system wiring bars with respect to the top view illustrated in FIG. 6A in the second embodiment of the present invention.

FIG. 6B is a power supply system wiring view added with power supply system wiring bars to the top view illustrated in FIG. 6A in the second embodiment of the present invention. Four terminals are arranged outside the control unit 1 corresponding to four lines in two sets of the power supply lines 35g and 35h, and the GND lines 36c and 36d.

Only a power supply circuit board 35i is illustrated on a left side of FIG. 6B, and only a GND wiring board 36e is illustrated on a right side of FIG. 6B. However, in an actual structure, two power supply wiring boards 35i are arranged at a right and at a left in a lower layer, and two GND wiring boards 36e are arranged at the right and the left in an upper layer thereof to form a two-story configuration. Further, those four wiring boards are integrated with insulating resin, but, in order to simplify the description, an insulating resin material is omitted.

Figure 6C:
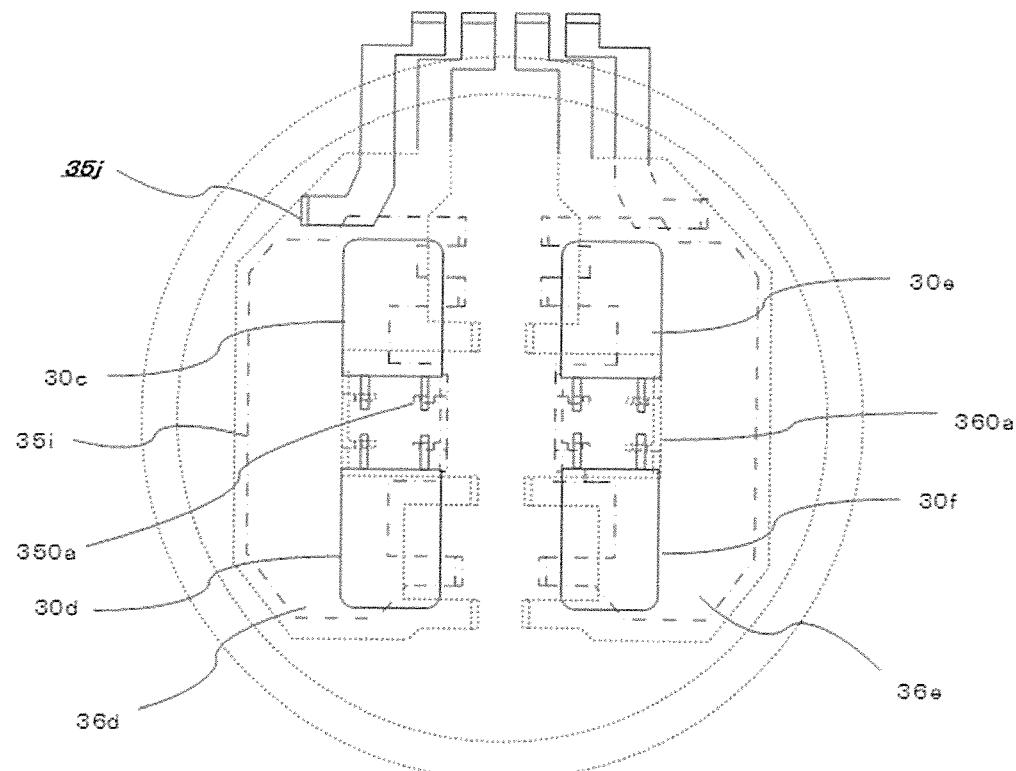
FIG. 6C is a diagram for illustrating a wiring state of four capacitors in the second embodiment of the present invention.

The capacitors 30c and 30d, and 30e and 30f are connected to terminal blocks 350a and 360a illustrated in FIG. 6B. FIG. 6C is a view for illustrating wiring states of the four capacitors in the second embodiment of the present invention. As illustrated in FIG. 6C, leg portions of each pair of four capacitors are connected to the terminal blocks 350a and 350b. In FIG. 6C, the power supply wiring board 35i is indicated by the one-dot chain line, and the GND wiring board 36e is indicated by the broken line.

Figure 6D:
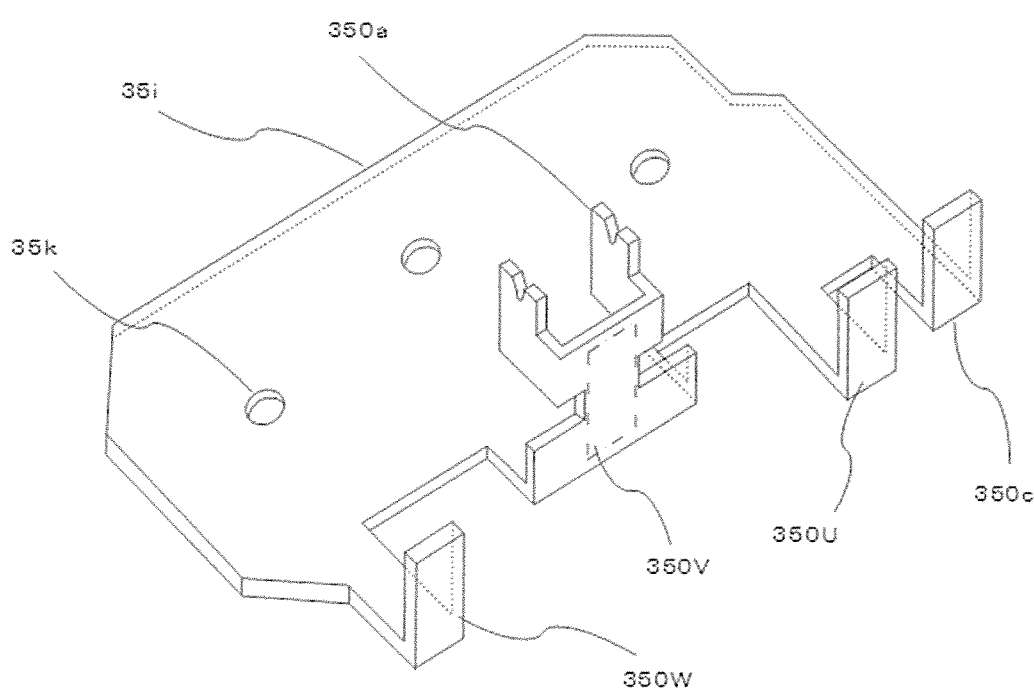
FIG. 6D is a perspective view of a power supply board in the second embodiment of the present invention.
Figure 6E:
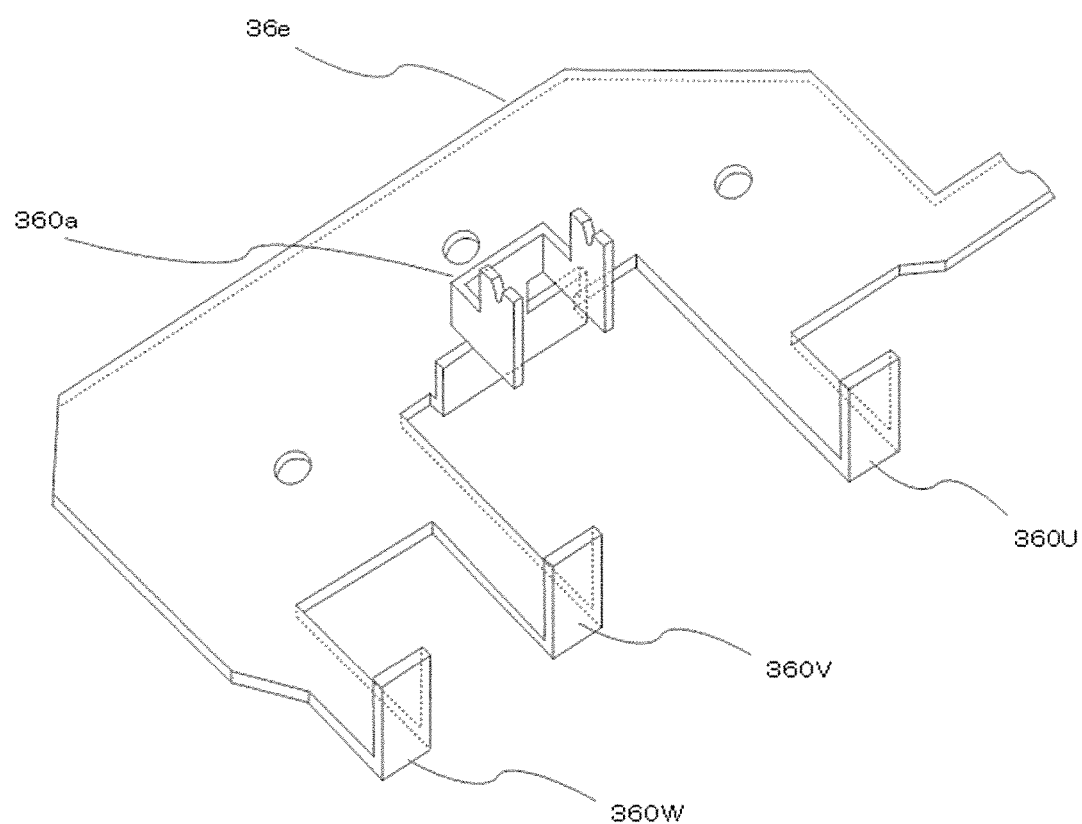
FIG. 6E is a perspective view of a GND board in the second embodiment of the present invention.

FIG. 6D is a perspective view of the power supply wiring board 35i in the second embodiment of the present invention. Further, FIG. 6E is a perspective view of the GND wiring board 36e in the second embodiment of the present invention. The power supply wiring board 35i and the GND wiring board 36e each include wiring boards in a pair in line symmetry to each other.

In FIG. 6D, the power supply terminal 350c is a terminal to which the power source via the power supply relay 5a is connected, and which is connected to the terminal 35c of the power module of FIG. 6A. The power source connected to the power supply terminal 350c is then connected to each phase.

Further, terminals 350U and 350W are connected to power supply input terminals of the inverter circuit of the U-phase and the W-phase, respectively. Still further, a power supply input terminal of the V-phase has a structure to be connected to a portion of the terminal block as indicated by the one-dot chain line.

As described above, the power supply wiring board 35i plays a role of a power supply wiring board configured to distribute the power source supplied from the terminal 350c to each phase. The power supply circuit board 35i has holes 35k. Positioning for integrating the insulating resin is performed through use of the holes. The GND wiring board 36e of FIG. 6E has also substantially a similar shape as that of the power supply wiring board 35i.

The terminal blocks 350a and 360a are arranged such that two arm portions are placed face to face. Then, leg portions of the capacitors are inserted into a groove formed at a center of the arm portions, and are connected by, for example, welding. The power supply wiring board 35i and the GND wiring board 36e are required to be conductive, and are thus formed by, for example, cutting and bending a copper plate.

In the structure in which the leg portions of the capacitors are inserted and connected to the respective terminal blocks 350a and 360a, the capacitors are wired in the vicinity of the V-phase power supply system. Therefore, the arrangement and wiring of the capacitors are performed between the inverter circuit of each phase. The structure is different from the related-art structure in which capacitors are wired outside, upstream, or downstream of the inverter circuit.

As described above, according to the second embodiment, the arrangement and wiring of the capacitors are contrived to integrate the current flow paths. As a result, capacitance or the number of capacitors is reduced, and hence the device is downsized. Further, a change in current flowing in the capacitors and the GND lines and a surge voltage due to inductance can be suppressed. As a result, for example, an adverse influence on accuracy in a current detection value, and a difference in usage environments of the capacitors can be suppressed.

Further, as illustrated in FIG. 6A to FIG. 6E, the wiring boards of the power supply line and the GND line can be separated from each other by the control unit 1a and the control unit 1b. As a result, each of the control unit 1a and the control unit 1b can prevent a current change at the time of switching of the inverter circuit and a surge voltage due to inductance from affecting a counterpart side.

In such a wiring structure, the wiring boards of the power supply line and the GND line of the control unit 1a and the control unit 1b may be completely electrically isolated, or may be connected at a single point on an upstream side (corresponding to a side close to the battery 6 in FIG. 5).

REFERENCE SIGNS LIST 1, 1a, 1b control unit; 2 motor; 3, 3a, 3b inverter circuit; 30a, 30b, 30c, 30d, 30e, 30f capacitor; 35g, 35h, 43 power supply line; 36c, 36d, 42 ground line (GND line)

The invention claimed is:

1. An electric power steering device, comprising:
an electric motor including multi-phase coils and configured to cause a steering mechanism of a vehicle to rotate; and
a controller including inverter circuits corresponding to respective phases of the electric motor and configured to drive the electric motor,
wherein the inverter circuits of the respective phases include bridge circuits, respectively, and capacitors for smoothing,
wherein each of the capacitors is arranged between adjacent bridge circuits of the respective phases,
wherein the controller is configured to be supplied with electric power via a power supply line and a ground (GND) line,
wherein the power supply line and the GND line are arranged to have regions adjacent to each other such that currents flow parallel to each other,
wherein the capacitors have positive terminals connected to the power supply line and negative terminals connected to the GND line in the adjacent regions, and
wherein the capacitors have a connection positional relationship in which at least one bridge circuit is arranged and wired on an upstream side and a downstream side of a positive electric supply source in an electric circuit.

2. The electric power steering device according to claim 1, wherein a number of the capacitors is smaller than a number of the respective phases of the electric motor.

3. The electric power steering device according to claim 1, wherein the capacitors are arranged between output terminals of the multi-phase coils of the electric motor.

4. The electric power steering device according to claim 1, wherein the multi-phase coils have three or more phases, respectively,
wherein the bridge circuits are configured to supply currents to the multi-phase coils of the electric motor, respectively, and
wherein the power supply line and the GND line are arranged to be adjacent to each other such that regions between the bridge circuits of the respective phases are the adjacent regions.

5. The electric power steering device according to claim 4, wherein the controller is formed to have a circular shape, and
wherein the positive terminals and the negative terminals of the capacitors are arranged in a radial direction of the controller, and are connected between the power supply line and the GND line.

6. The electric power steering device according to claim 1, wherein the controller includes the electric motor formed by two sets of three-phase coils, and the inverter circuits formed by two sets of three phases,
wherein the inverter circuits, which are formed by two sets of three phases, are formed by a set of inverter circuits in a row in line symmetry,
wherein the controller individually provides a wiring including the power supply line and the GND line to an inverter circuit in each set; and
wherein a capacitor of the inverter circuit in a first set is connected between the power supply line and the GND line of the inverter circuit in the first set, and a capacitor of the inverter circuit in a second set is connected between the power supply line and the GND line of the inverter circuit in the second set.

7. The electric power steering device according to claim 6, wherein the wiring is formed by arranging to laminate four wiring boards, which are the power supply line of the inverter circuit in the first set, the GND line of the inverter circuit in the first set, the power supply line of the inverter circuit in the second set, and the GND line of the inverter circuit in the second set,
wherein each of the four wiring boards has a terminal block, to which leg portions of the capacitors are to be connected, at a center portion of the each of the four wiring boards,
wherein the capacitor of the inverter circuit in the first set is connected between terminal blocks provided to the wiring boards of the power supply line and the GND line in the inverter circuit in the first set, and
wherein the capacitor of the inverter circuit in the second set is connected between terminal blocks provided to the wiring boards of the power supply line and the GND line in the inverter circuit in the second set.

8. The electric power steering device according to claim 7, wherein the inverter circuits formed by two sets of three phases are modularized to include respective three-phase power modules in each set into one module, and
wherein three terminals corresponding to three phases of each of the four wiring boards are arranged on an inner diameter side of the controller as terminals configured to connect the capacitor.

9. The electric power steering device according to claim 7, wherein, among the four wiring boards, at least one of the wiring boards of the power supply line in the inverter circuit in the first set and the wiring board of the power supply line in the inverter circuit in the second set, and the wiring board of the GND line in the inverter circuit in the first set and the wiring board of the GND line in the inverter circuit in the second set are physically separated from each other, and the physically separated wiring boards are connected to each other on a side closer to a power supply source than any one of the bridge circuits of each set of the inverter circuits.

10. The electric power steering device according to claim 1, wherein the electric motor and the controller are integrated with each other.

* * * * *